Feb. 17, 1953 G. E. NELSON 2,628,857
RELEASABLE BALE HOOK
Filed July 19, 1949
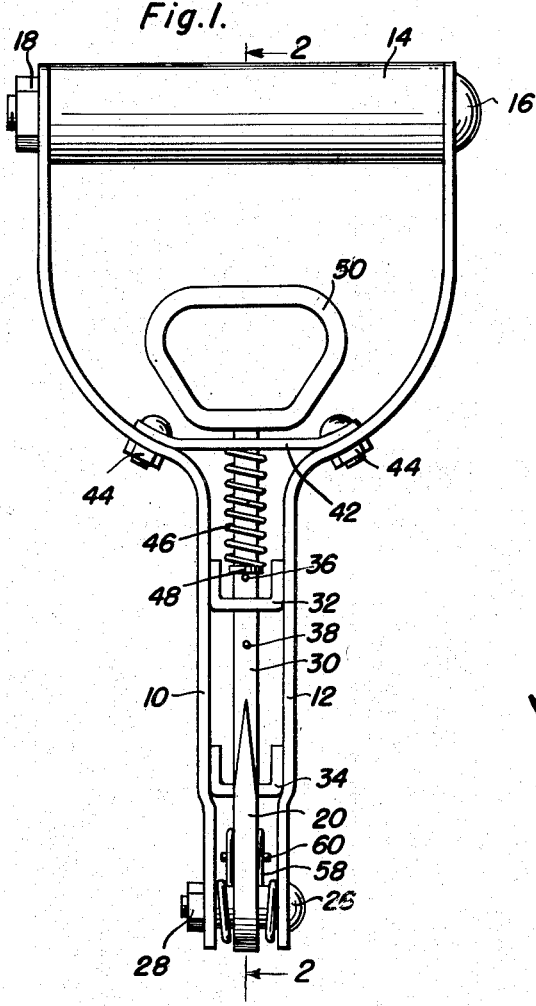
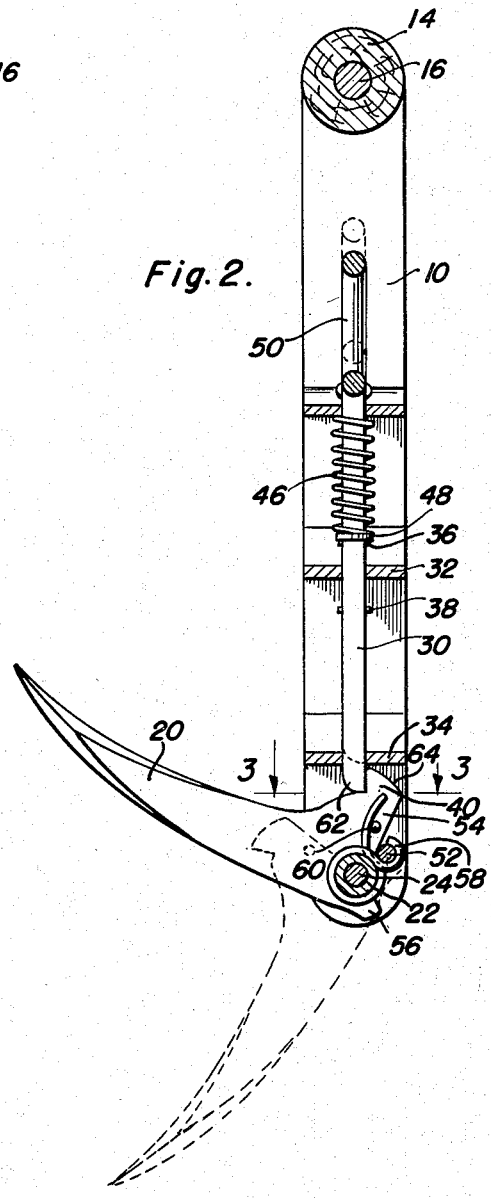
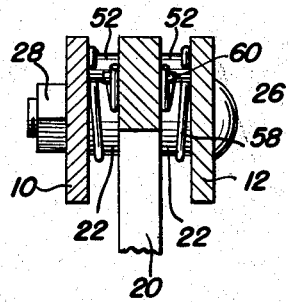
George E. Nelson
INVENTOR.

Patented Feb. 17, 1953

2,628,857

UNITED STATES PATENT OFFICE 2,628,857

RELEASABLE BALE HOOK

George E. Nelson, Salem, Wash.

Application July 19, 1949, Serial No. 105,487

1 Claim. (Cl. 294—26)

This invention relates to bale hooks and more specifically pertains to a bale hook wherein the hook is releasable to pivot away from engagement with the goods being handled by the bale hook.

The primary object of the present invention is to provide a bale hook for handling such articles as baled hay, pulp wood, and cartoned goods, which may be operated to release the goods being handled.

An important object of the present invention is to provide a bale hook in accordance with the foregoing object, which will release the handled goods at the precise instant desired for efficacious handling of the same, and which will materially reduce the chance of injury to a person moving heavy materials.

Another important object of the present invention is to provide a bale hook in conformity with the foregoing objects, which will be of inexpensive construction and in which the releasing mechanism may be easily operated, thereby saving time, effort and expense.

An important feature of the present invention resides in the provision of a construction wherein the latch bar cannot be accidentally moved to release the hook, and the stop means for limiting the pivotal movement of the hook.

Another important feature of the present invention resides in the arrangement of the latch bar and the locking dog, whereby the latch bar may be easily moved even when the bale hook is being employed to hold very heavy articles.

These, together with various ancillary objects and advantages of the invention which will later become apparent as the following description proceeds, are attained by the present invention, a preferred embodiment of which has been illustrated by way of example only in the accompanying drawings, wherein:

Figure 1 is a front elevational view of the bale hook, showing the same in operative position;

Figure 2 is a vertical longitudinal sectional view of the present invention taken upon the plane of the section line 2—2 of Figure 1, the released position of the latch bar and hook being shown in dotted outline; and Figure 3 is an enlarged fragmentary detail sectional view taken upon the plane of the section line 3—3 of Figure 2.

Reference is now made more specifically to the accompanying drawings, wherein like numerals designate similar parts throughout the various views, and in which spaced frame members are indicated by the numerals 10 and 12. As shown in Figure 1, the upper ends of the frame members 10 and 12 are widely spaced and have a handle 14 connected therebetween by bolt 16 and nut 18.

A hook 20 provided with an arbor or hub 22 projecting from the opposite sides thereof, is pivoted between the lower ends of the frame members 10 and 12 by a pivot pin 24 which extends axially through the arbor or hub 22 and the frame members 10 and 12. In the preferred construction, a bolt 26 and nut 28 are used to form the pivot 24, the bolt 26, nut 28 and arbor 22 serving to maintain the lower ends of the frame members 10 and 12 in spaced relationship.

A latch bar 30 is disposed between the frame members 10 and 12 and is slidable through apertures in the U-shaped spacing bars 32 and 34, which are connected between the frame members 10 and 12. The latch bar 30 is retained in the spacing bars 32 and 34 by pins 36 and 38 which limit the longitudinal movement of the latch bar 30 therethrough. A locking dog 40 is carried on the hook 20 and is adapted to be engaged by the latch bar 30 when the latter is lowered and the hook 20 is in the operative position.

A latch bar guide 42, apertured to slidingly receive the latch bar, is secured between the frame members 10 and 12 as at 44. The latch bar 30 is urged downwards by a compression spring 46 that embraces the latch bar and has its upper end seated against the lower surface of the latch guide 42, and has its lower end seated against a stop collar 48 that rests against the pin 36. A loop 50 carried on the upper end of the latch bar 30 forms a grip whereby the operator can raise the latch 30 from engagement with the locking dog 40.

A stop pin 52 is disposed between and connects the frame members 10 and 12 close to the pivot 24. As shown in Figure 2, the hook 20 is provided with an extension 54 forming a part of the locking dog 40 and a stop lug 56, which in conjunction with the stop pin 52 limit the pivotal movement of the hook 20 between the positions shown in Figure 2.

The hook 20 is yieldingly urged toward the operative position by springs 58, each having one end anchored on the stop pin 52 and the other end anchored on spring seats 60 on the hook 20.

The latch bar 30 and the locking dog 40 are provided with cam surfaces 62 and 64, respectively, whereby the latch bar 30 is raised sufficiently to pass over the locking dog 40, when the hook 20 is pivoted to the operative position. In the preferred construction, the latch bar is rectangular below the stop collar 48 and the space bars 32 and 34 are correspondingly apertured to prevent rotation of the latch bar 30, thus keeping the cam surfaces 62 and 64 in proper relationship.

From the preceding description it will be seen that the hook 20 is normally in the operative position, being locked in this position by the latch bar 30 and the locking dog 40. When the hook 20 is in operative position a load may be carried thereby; however, when the latch bar 30 is raised and the locking dog 40 released, the load will cause the hook 20 to rotate to the position indicated in dotted outline in Figure 2, thereby releasing the load. As soon as the load has been released the hook 20 will rotate to the operative position through the action of the springs 58, whereupon the latch bar 30 through the action of the spring 46 engages the locking dog 40. It will be understood that the springs 58 are of sufficient strength that in conjunction with the cam surfaces 62 and 64, the latch bar 30 will be raised overpowering the spring 46. It will be understood that although the hook 20 tends to rotate to the operative position that the same cannot be locked in the operative position as long as the operator continues to hold the latch bar 30 up, thus preventing accidental re-engagement of the hook 20 with the load.

The present invention has the advantage of requiring the use of only two moving parts, that is, the latch bar 30 and the hook 20. It will be noted that the latch bar 30 is positioned within the frame in a protected position, so that accidental release of the hook 20 and all the damage that could be caused thereby is highly unlikely.

Since the latch bar 30 is in a sheltered position, the spring 46 may be of considerably less strength than those normally used in devices of this character, thereby requiring a minimum of effort by the operator to disengage the latch bar 30 from the locking dog 40. The stop lug 56, in addition to protecting the springs 58 from over-extension, is a safety feature which prevents the hook 20 from being rotated to a position that would endanger the operator.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having described the invention, what is claimed as new is:

A bale hook comprising a pair of spaced, opposed bars, a bolt connecting one end portion of said bars, a pin extending between the bars adjacent said bolt, a handle mounted between the other end portions of the bars, a hook including a hub on one end portion journalled on the bolt, circumferentially spaced lugs on the hub engageable with the pin for positively limiting swinging movement of the hook in opposite directions, coil springs on the hub on opposite sides of the hook having one end anchored to the pin and their other ends anchored to one of the lugs for returning said hook to operative position, and a spring projected, manually retracted latch slidably mounted between the bars and engageable with said one lug for releasably securing the hook in operative position.

GEORGE E. NELSON.

REFERENCES CITED

The following references are of record in the file of this patent:

UNITED STATES PATENTS

| Number | Name | Date |
|---|---|---|
| 782,302 | Williams | Feb. 14, 1905 |
| 905,576 | Porter | Dec. 1, 1908 |
| 920,700 | Waterman | May 4, 1909 |
| 1,004,297 | Nygren et al. | Sept. 26, 1911 |
| 1,116,683 | Gaskill | Nov. 10, 1914 |
| 2,138,694 | Daugherty | Nov. 29, 1938 |